United States Patent

[11] 3,625,554

| [72] | Inventors | Jean Oliver Louis Mottais;<br>Jean-Pierre Yves Maratray, both of Loire Atlantique, France |
|---|---|---|
| [21] | Appl. No. | 14,979 |
| [22] | Filed | Feb. 27, 1970 |
| [45] | Patented | Dec. 7, 1971 |
| [73] | Assignee | Societe Nationale Industrielle Aerospatiale<br>Paris, France |
| [32] | Priority | Mar. 5, 1969 |
| [33] | | France |
| [31] | | 6906052 |

[54] DEVICE FOR RAPID FIXING OF A TOOL TO THE END OF A ROTATING SHAFT
5 Claims, 14 Drawing Figs.

[52] U.S. Cl. .................................................. 287/52.05, 287/103
[51] Int. Cl. .................................................. F16d 1/06
[50] Field of Search .......................................... 287/52.05, 53 TK, 103 A, 103 D; 279/97, 86, 76, 79

[56] References Cited
UNITED STATES PATENTS

| 1,413,280 | 4/1922 | Kengel | 287/53 TK UX |
| 1,424,743 | 8/1922 | Smith | 287/103 A X |
| 1,886,177 | 11/1932 | Gairing | 279/76 X |
| 2,540,937 | 2/1951 | Edens | 279/76 X |
| 2,801,860 | 8/1957 | Getts | 279/97 |

*Primary Examiner*—Andrew V. Kundrat
*Attorney*—Mauro & Lewis

ABSTRACT: The invention is concerned with a device for the rapid fixing and releasing of a tool such as a countersink to the end of a rotating shaft. In accordance with the invention the tool has a transverse bore having an internal projection. A resilient device is provided within the bore and the shaft has a facet on which the resilient device can bear.

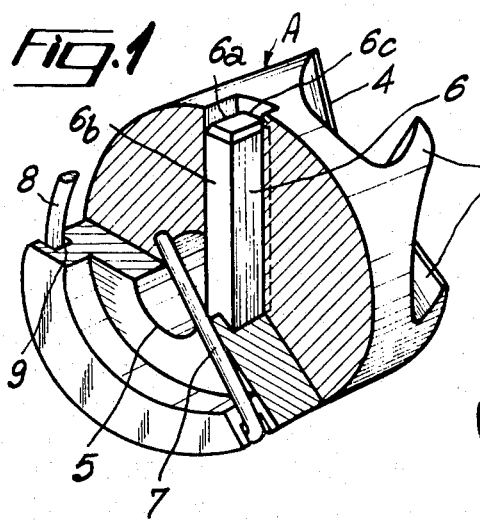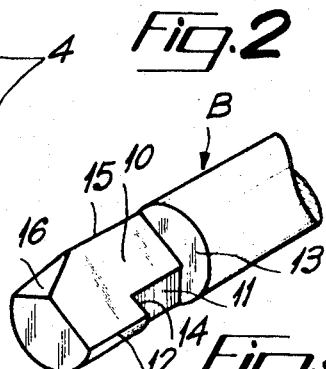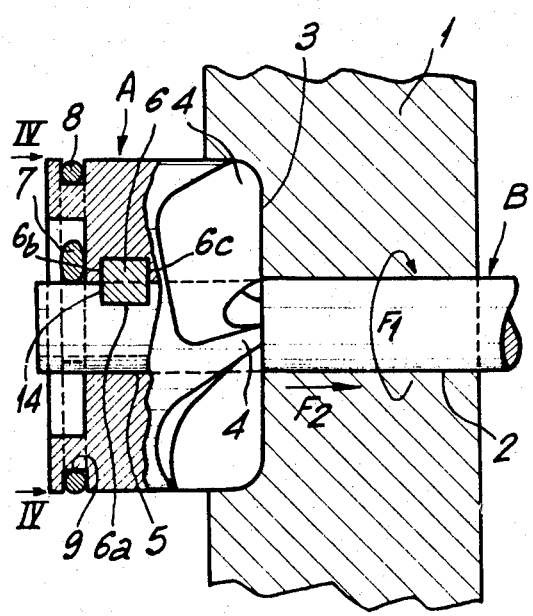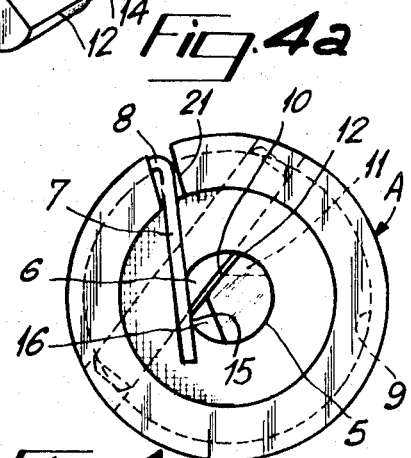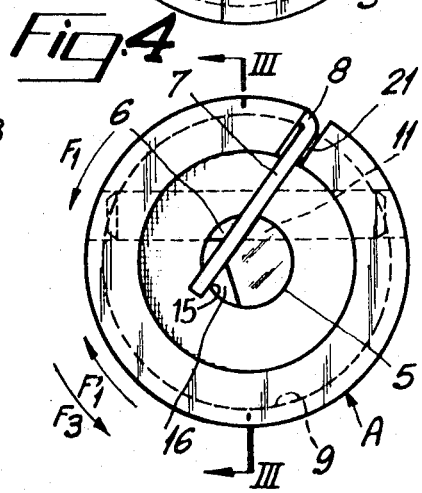

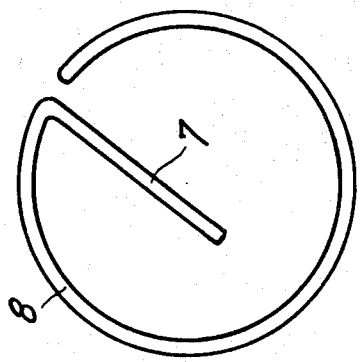
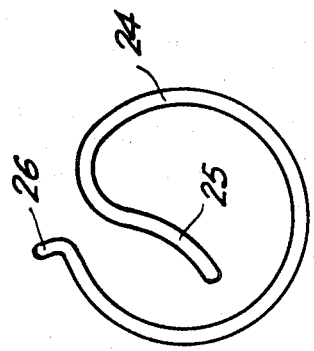
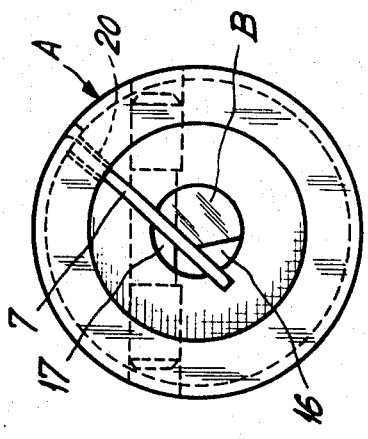
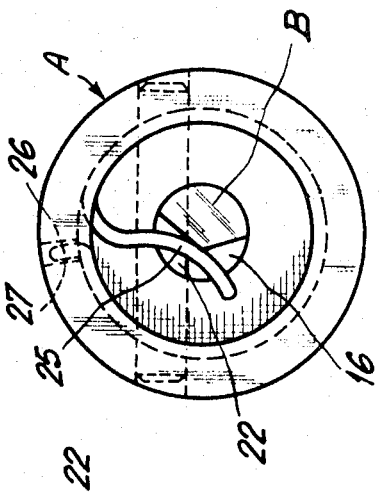
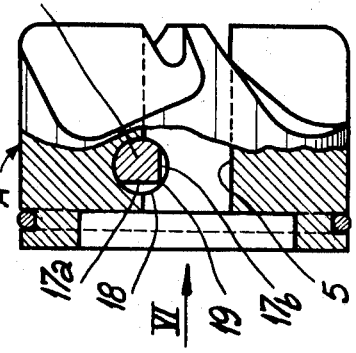
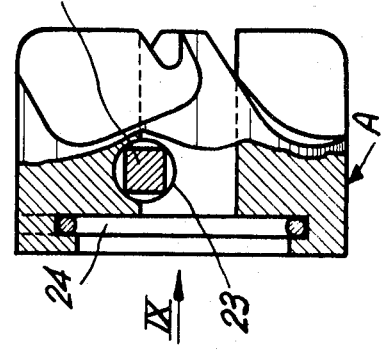

DEVICE FOR RAPID FIXING OF A TOOL TO THE END OF A ROTATING SHAFT

The invention relates to a device for rapid fixing and release of a tool to the end of a tool-rotating shaft, the fixing enabling the tool to be driven and to be locked to the shaft.

The invention is of use more particularly for the tools normally used on small portable machines, more particularly small tools, such as countersinks, which are fitted to relatively long shafts and are used with a pulling instead of a pushing action—i.e., the tool is fitted and dismantled for each use, the shaft being passed without tool through an aperture, whereafter the tool is fitted to the shaft, whereafter the tool does its work while being pulled, whereafter the tool is removed from the shaft.

The known devices for this purpose are unsatisfactory. The fixing and removal of tools from screw-threaded shafts is a lengthy and sometimes difficult operation, as is the case with draw tools of this kind when the same are used in inaccessible boxlike constructions or in areas where the tool is difficult of access for tightening and slackening. Small-diameter screw-threaded drive shafts are fragile and the screw threads often become locked in position at the end of the screw-threaded zones. In the case of tools having bayonet or square-shank connections or in cases where there is a driving facet, the retaining means, where present, are often fragile and for satisfactory operation require the user to use some force to fit and release them.

In the special case of countersinks which operate while being pulled, a further complication in use is that when the operator pulls the machine with the tool in it towards him so as to apply the tool to the surface to be treated, unless the drive system has a really satisfactory retaining device the tool may release accidentally and, as a rule, drop, sometimes into difficultly accessible zones. However, the retaining facility must not make it difficult to fit and remove the tool. This likelihood of the tool releasing and dropping may also occur with the known facilities as a result of the residual torque due to the inertia of the tool when the machine stops with the tool disengaged from the work, and in facilities where tool clamping is operative only by virtue of the resistive torque which acts on the tool when the same is in use.

This invention relates to a driving and locking device which is of use for the rotating tools used on machine tools, more particularly small portable machines where the tools are required to be rapidly and readily fixed and released without any risk of accidental release in use.

According to the invention, the tool has transversely of its bore: a keylike internal lateral projection extending along a first chord of the bore; and, axially offset from this key, a resilient device applying a force directed perpendicularly to a second chord of the bore, the second chord forming an angle with the first chord; and the shaft engaging in the bore has, extending from its end, a facet on which the resilient device can bear, and the shaft portion having the facet is formed, along the facet edge which is at the rear as considered in the normal direction of shaft rotation, with a recess shaped to match the key, the angular offset between the recess base and the facet corresponding to the angular offset between the two chords.

Preferably, and clearly to facilitate machining, a key is actually engaged in a channel extending transversely of the tool bore and eccentrically of its axis, although a key of this kind could be machined in the member from the solid.

As will become apparent hereinafter, the device according to the invention provides automatic fitting of a tool to the end of a shaft by the tool just being pushed over the shaft, the tool being released by being turned slightly relative to the shaft, then pulled for release.

The device according to the invention can transmit large torques even with very narrow drive shafts, e.g. of just a few millimeters diameter, and is of use with tools of very small diameter and thickness dimensions.

As will also be apparent, the clamping of the tool to the shaft is positive not only in operation but also when a pull or push is applied to the tool via the shaft, whether or not the tool is in operation. In the drawings:

FIG. 1 is a perspective and partly sectioned view, by way of nonlimitative example, of a rotating tool adapted to be fitted to a shaft shown, also by way of example, in FIG. 2;

FIG. 3 is a view in axial section, with partial side elevation, of the tool and shaft shown in FIGS. 1 and 2 when in position on the shaft for operation, the section being on the section line III—III of FIG. 4;

FIG. 4 is a section on the line IV—IV of FIG. 3;

FIG. 4a is a view similar to FIG. 4 showing the tool engaged on the shaft in the position for fitting or release;

FIGS. 5, 8 and 11 are views in section and partial elevation of variants of the tool shown in FIG. 3;

FIGS. 6, 9 and 12 are sections on the lines VI, IX and XII of FIGS. 5, 8 and 11 respectively;

FIGS. 7 and 10 are plan views of possible shapes for the springs, and

Figure 11:
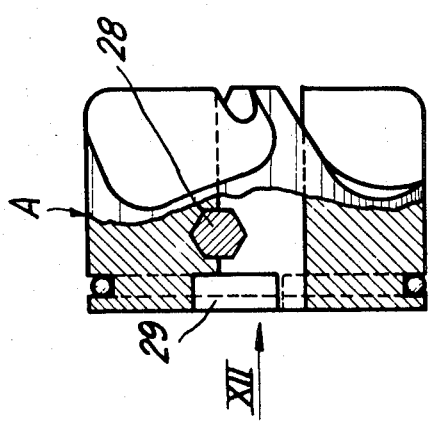

A tool A shown in FIG. 1 is a draw countersink; it is mounted, as will be described hereinafter, on a shaft B shown in FIG. 2.

FIG. 3 shows clearly how a tool of this kind can be used. Assuming that shaft B is driven by a portable machine tool and rotates in the direction indicated by an arrow $F_1$, the user pulls shaft B towards himself in the direction indicated by an arrow $F_2$ so that tool A cuts countersink 3 around an aperture 2—through which shaft B extends—in a wall 1 to be machined; countersink 3 is adapted to receive e.g. a nut or a rivet head whose shank or stem extends through aperture 2. The tool accordingly comprises cutting edges 4 distributed around a bore 5 for shaft B and arranged to correspond with the direction of rotation of shaft B.

Extending some of the way across bore 5 is a key 6 which is of square cross section in the example shown in FIGS. 1–4 and which is eccentric of the axis of bore 5 so as to form, projecting thereinto, a flat surface 6a, which is parallel to the bore axis and which extends along a chord of the bore, and two surfaces 6b, 6c perpendicular to the bore axis.

An arm 7 of a steel wire spring is disposed transversely of the bore; for convenience of securing to the tool, arm 7 is extended by an open circle 8 which is received in a groove 9 in tool A, groove 9 being offset axially from key 6.

The free end of shaft B, such end being shown in FIG. 2, has a facet 10 and is formed with a recess 11 in one of the edges 12 along which facet 10 meets the cylindrical surface of the shaft. Facet 10 and recess 11 are bounded by a plane surface 13 which is perpendicular to the geometric axis of the shaft. On the side opposite to the surface 13, recess 11 has a plane surface 14. The terminal part of the shaft has an inclined surface or chamber 16 on the side corresponding to the other edge 15 opposite to the edge 12.

When shaft B is engaged in the bore in tool A on the side opposite to spring arm 7, the shaft can penetrate only if facet 10 is opposite the flat surface 6a (FIG. 3) of key 6. If the shaft is then pushed further into the tool, chamfer 16 comes below spring arm 7 and urges the same laterally away from the center of the bore. After spring arm 7 has been thus moved, edge 15 contacts it and keeps it in the moved-away position; edge 15 is then in the position shown in FIG. 4a relatively to shaft B.

When surface 13 of shaft B meets surface 6c of key 6, engagement of the tool on the shaft stops and recess 11 is then opposite key 6. The reaction of spring arm 7 against edge 15 then causes the tool to rotate in the direction indicated by an arrow $F'_1$ (clockwise), so that at the end of the tool-mounting operations, and as FIG. 4 shows, key 6 is engaged in recess 11 and spring arm 7 rests flat against facet 10 of shaft B.

Conversely, to release the tool, once shaft B has stopped the tool is turned in the direction indicated by an arrow $F_3$ (anticlockwise) so that edge 15 moves spring arm 7 away to allow facet 10 to engage with surface 6a, whereafter the tool can be withdrawn by being slid along the shaft.

When the shaft rotates in the direction indicated by the arrow F₁ and a resistive torque is applied to tool A, recess 11 tends to become more firmly engaged with key 6, so that the tool continues to be driven and is clamped positively to the shaft. The tool cannot therefore separate from its shaft. This happens because the recess 11 begins the edge 12 which is at the rear as considered in the direction of rotation of shaft B. Should the same stop abruptly, the tool tends to continue to move by inertia in the direction indicated by arrow F₁ and is maintained by inertia in the base of recess 11.

There may be a slight bending of spring arm 7 at starting; however, spring arm 7 when in engagement with facet 10 also helps to drive the tool, and so there is unlikely to be an appreciable angular movement of the tool relatively to the shaft. Also, when the tool is pulled in the operative direction, key surface 6b abuts surface 14 and causes no reaction of the tool in the locking direction. Similar considerations apply when the tool is pushed, the surface 13 then abutting the plane surface 6c which is perpendicular to 11—shaft axis.

Locking is better in proportion as the force of the spring arm 7 is greater; this force does not have to be considerable in practice since the torques arising from the tool being pulled or pushed are zero and when in operation—i.e., when experiencing a resistive torque—the tool is automatically locked.

The next Figures show constructional variants of the device for fixing the tool to its shaft.

Referring to FIG. 5, a key 17 is of cylindrical cross section and has merely two facets 17a, 17b adapted to bear the one against surface 14 and the other against the base of recess 11-i.e., the surfaces which withstand the strongest reactions in operation. Key 17 is received in a cylindrical bore 18 in tool A and bears against the bore wall by way of its cylindrical periphery and by way of an edge 19 between the two key surfaces 17a and 17b. The spring arm 7 is identical to the integer used in FIGS. 1-4 but extends through a bore 20 in the tool instead of being engaged, as in the previous embodiment, in slot 21.

In the embodiment shown in FIGS. 8-10, a square cross section key 22 engages in a cylindrical bore 23, contacting the same by way of its four edges; there is a circular spring 24 but it is disposed in the recess presented by the tool end face when the tool is seen from the front. Spring 24 acts on shaft B by way of a spring arm 25 which extends towards the center of the recess, the corresponding reaction being withstood by the other end 26 of the circular spring, end 26 being bent radially outwards and engaging in a bore 27 in the tool periphery.

Figure 12:
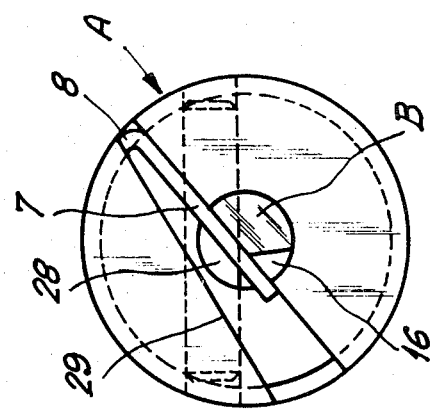

In the embodiment shown in FIGS. 11 and 12, key 28 is hexagonal, but since the plane of the surfaces of key 28 extends through a perpendicular to the tool axis, the tool, whether pulled or pushed, cannot experience any sliding reaction tending to rotate it on its shaft, and so there is no risk of accidental tool release. The spring of this embodiment is of the form shown in FIG. 7 and its operative arm 7 is movable in a wedge-shaped recess 29 whose apex corresponds to the bent part of the spring which remains stationary.

Figure 13:
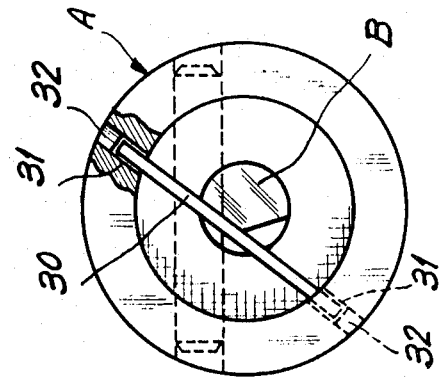
FIG. 13 is a view in front elevation of an alternative form of tool.

As can be seen in FIG. 13, the spring can be straight instead of being associated with an open ring. The spring 30 of FIG. 13 slides by its ends in bores 31 in the edge of the recess forming the tool surface, the bores 31 being closed at their ends by plugs 32 to prevent spring 30 from escaping. The spring could have one end welded or secured in any manner to tool A. The resilient arms 7, 25, 30 can be rigid and, with or without articulation at their end, can be pushed or pulled by appropriate springs. The spring embodiment shown in FIG. 7, i.e., in the form of an open ring engaging in a groove in the outside of the tool, is preferable for its simplicity, since the whole spring and not just the inwardly extending spring arm provides the resilient force for locking the tool.

In tools which operate by being pushed, the spring can be placed on the tool surface opposite to the end of shaft B, in which case the shaft facet 10 is extended beyond recess 11 and the depth of penetration of the shaft into the tool can be limited by the spring abutting a surface, such as the surface 13, of shaft B.

We claim:

1. Means for the rapid fixing of a centrally bored tool to the end of a unidirectionally rotating shaft, the tool having transversely of its bore a keylike internal projection extending along a first chord of the bore and the shaft engaging said bore having, extending from its end, a facet and, along the facet edge which is at the rear as considered in the normal direction of shaft rotation, a recess shaped to match the key, the improvement that the tool has, axially offset from said key, a transverse resilient member, the active portion of which is substantially directed along a second chord of said bore and the terminal part of the shaft has a chamfer which intersects the end of the facet edge opposite to said facet edge formed with the recess, the angular offset between the recess base and the facet corresponding to the angular offset between the two chords.

2. The invention according to claim 1, wherein one end surface of the tool is provided with a flat-bottomed recess receiving said transverse resilient member.

3. The invention according to claim 2, wherein said tool is provided, level with said recess bottom, with an outer peripheral groove connected with said recess by a radial notch, and wherein the active portion of the transverse resilient member is the inwardly bent end of a resilient metal wire, the other part of said wire being open ring shaped and located in said groove with the bent end engaging said notch, 4. The invention according to claim 2, wherein said resilient member is a rectilinear thin metal member directed along said second chord, the ends of the said member engaging holes provided in the peripheral wall of said recess.

5. The invention according to claim 2, wherein the tool is a draw countersink and the recess is contrived in that side of the tool which is near the shaft end.

* * * * *